United States Patent [19]

Ewert et al.

[11] Patent Number: 4,967,318
[45] Date of Patent: Oct. 30, 1990

[54] VEHICLE HEADLIGHT

[75] Inventors: Alfred Ewert; Franz Kathmann, both of Lippstadt, Fed. Rep. of Germany

[73] Assignee: Hella KG Hueck & Co., Lippstadt, Fed. Rep. of Germany

[21] Appl. No.: 315,762

[22] Filed: Feb. 27, 1989

[30] Foreign Application Priority Data

Mar. 3, 1988 [DE] Fed. Rep. of Germany ....... 8802828
Mar. 3, 1988 [DE] Fed. Rep. of Germany ....... 8802829

[51] Int. Cl.$^5$ .............................................. B60Q 1/00
[52] U.S. Cl. .................................. 362/61; 362/419; 362/427; 362/287
[58] Field of Search ................... 362/61, 80, 285, 289, 362/287, 427, 429, 418, 419, 428, 421

[56] References Cited

U.S. PATENT DOCUMENTS

| | | | |
|---|---|---|---|
| 4,621,307 | 11/1986 | Weber | 362/80 |
| 4,707,770 | 11/1987 | Van Duyn | 362/61 |
| 4,794,495 | 12/1988 | McMahan et al. | 362/289 |
| 4,831,502 | 5/1989 | Fujino et al. | 362/61 |

FOREIGN PATENT DOCUMENTS

| | | |
|---|---|---|
| 1755157 | 5/1970 | Fed. Rep. of Germany . |
| 2161780 | 1/1974 | Fed. Rep. of Germany . |
| 2417029 | 10/1975 | Fed. Rep. of Germany . |
| 2630068A1 | 1/1978 | Fed. Rep. of Germany . |
| 2847112 | 5/1980 | Fed. Rep. of Germany ........ 362/80 |
| 3003297A1 | 8/1980 | Fed. Rep. of Germany . |
| 3149831.0 | 12/1981 | Fed. Rep. of Germany . |
| 83134506 | 10/1984 | Fed. Rep. of Germany . |
| 3445703A1 | 6/1985 | Fed. Rep. of Germany . |
| 3509831.7 | 3/1986 | Fed. Rep. of Germany . |
| 3602263A1 | 10/1986 | Fed. Rep. of Germany . |
| 3525618A1 | 1/1987 | Fed. Rep. of Germany . |
| 2351350 | 12/1977 | France ................................. 362/80 |
| 0229628 | 10/1986 | Japan ................................. 362/427 |

*Primary Examiner*—Stephen F. Husar
*Assistant Examiner*—D. M. Cox
*Attorney, Agent, or Firm*—Griffin Branigan & Butler

[57] ABSTRACT

A mount for a headlight reflector includes three pivot-point mechanisms, at least one of which comprises a spherical head at an end of a pivot-mechanism pin mounted in an elongated socket formed on a receiver rigidly attached to the reflector. The axis of elongation of the pivot-mechanism pin is approximately parallel to an optical axis of the headlight and an axis of elongation of the socket is perpendicular thereto, with one end of the socket being open to allow ingress and egress of the spherical head. A side of an elongated shell forming the socket has a slit therein facing a back wall of a headlight housing through which the pivot-mechanism pin passes. In one embodiment of the invention, an outer end of the pivot-mechanism pin is coupled to an adjusting bolt which is parallel to the pivot-mechanism pin by means of a moveable bridge. In another embodiment, a power automatic light-distance adjusting mechanism can be mounted on the bridge for providing additional longitudinal movement to the pivot-mechanism pin.

21 Claims, 4 Drawing Sheets

VEHICLE HEADLIGHT

BACKGROUND OF THE INVENTION

This invention relates generally to the art of vehicle headlights, and more particularly to a vehicle headlight in which a reflector can be selectively rotated about either of two perpendicular axes for adjusting a beam produced by the headlight.

It has been suggested to mount a vehicle headlight reflector on two adjustable pivot point mechanisms and a third pivot point mechanism. In one such suggested system, at least one of the pivot point mechanisms comprises a spherical head, or ball, mounted in a socket of a receiver which is rigidly attached to the reflector. The spherical head is attached to a pivot-mechanism pin which extends approximately parallel to an optical axis of the headlight to a back-wall opening in a headlight housing. An attachment member engages an outer end portion of the pivot-mechanism pin to the back wall at the back-wall opening. A well known headlight assembly of German Offenlegungsschrift 35 09 831 has such a pivot-mechanism pin with threads which are screwed into a nut mounted at a back-wall opening. A turning knob is mounted on the end of the threaded pin extending through the opening outside the headlight housing while a spherical head of the pivot-mechanism pin rests in a socket of a receiver rigidly coupled to a reflector. This spherical coupling is uncomplicated and quick to mount, however, it is difficult to dismount because a relatively large jerking force is required to release the spherical head from the socket. Doing this can damage the headlight.

Sometimes it is desirable to separate the spherical head from the socket to replace a first pivot-mechanism pin with a pivot-mechanism pin of a power-driven light-distance adjusting mechanism. Such an exchange would be simple and quick if it could be made from the back side of the headlight without detaching other connections between the reflector and the housing, however, when such a pivot-mechanism pin of a power-driven light-distance adjusting mechanism is pressed into a socket this can cause damage to inner workings of the power adjusting mechanism.

A jerky attachment and/or detachment of the sphere and socket of the Offenlegungsschrift 35 09 831 headlight could be reduced if a connection between the receiver and the reflector could be disassembled through a further hole in the backside of the housing. However, in order to do this, either for replacing a fixed pivot point mechanism with an adjustable pivot point mechanism or a manually adjustable mechanism with a power mechanism, the reflector would still have to be dismounted at all three pivot point mechanisms because the receiver is larger than the opening can be in the back wall of the housing. Such a dismounting of the reflector is quite burdensome and time consuming. In the case of the headlight of Offenlegungsschrift 31 49 831, in which reflector is in the interior of a housing formed by a housing rear wall and a light transmissive shield, the reflector must not only be removed from all three supports, but the light transmissive shield must also be removed from the back wall of the housing. Again, this can cause damage to the light transmissive shield or the housing back wall. Also, if the light transmissive shield and back wall of the housing are not properly sealed together, and because of the opening in the rear wall of the housing through which the connection between the reflector and the receiver are made, water and mud can get into the interior of the headlight.

Therefore, it is an object of this invention to improve such headlight structures by providing a spherical-head receiver structures which allows removal of such pivot-mechanism pin spherical heads therefrom, for both fixed and manually adjustable pivot-point mechanisms, so that the pivot mechanism pins can be removed through openings in back walls of the headlights. After such dismounting, a pivot-mechanism pin of a power light-distance adjusting mechanism can have its spherical head coupled to the receiver rigidly mounted on the reflector from outside the back wall of the headlight. In addition, the reflector is easily adjustable and firmly mounted.

A further prior art headlight is disclosed in German Gebrauchsmuster 83 13 450. In this device an attachment member attaching a pivot-mechanism pin to an edge of an opening in the back wall of a housing is ring formed and elastic so as to form a portion of the back wall which seals on a pivot-mechanism pin. A length axis of the pivot-mechanism pin passes through the ring-formed elastic wall portion and is approximately perpendicular to a length axis of an adjusting screw which is mounted outside of the housing, perpendicular to an optical axis of the headlight. An outer end of the pivot mechanism pin has a nut attached thereto with which threads of the adjusting screw engage, while an inner end of the pivot mechanism pin has a spherical head thereon which is mounted in a shell of a receiver whose length axis aligns with the axis of the pivot mechanism pin. With such a mechanism, a contacting area between the pivot mechanism pin and the ring formed elastic wall portion become a pivot and the pivot mechanism pin becomes a lever having two working ends. If the ring formed elastic wall portion is constructed of a very elastic raw material, manual adjustment of the headlights requires a relatively small force, however, the reflector vibrates quite a bit while the vehicle is driving. Also, with such a headlight, it is not possible to later mount a pivot mechanism pin of a power light-distance adjusting mechanism to the reflector through such a ring formed elastic wall portion.

Therefore it is an object of this invention to improve such a headlight by providing a structure which allows a first pivot mechanism pin to be replaced by a pivot mechanism pin of a power light-distance adjusting mechanism without disassembling a headlight housing. It is also an object of this invention to provide a structure which allows a pivot mechanism pin to be easily manually adjustable and relatively vibration free during driving. In addition, it is an object of this invention to provide such a structure in which a relatively small force is required, either manually or power driven, to adjust a reflector through the pivot mechanism pin.

SUMMARY

According to principles of this invention, a receiver includes an elongated shell for forming an elongated socket whose length axis is perpendicular to a length axis of a pivot-mechanism pin, with a diameter of the socket corresponding to a diameter of a spherical head of the pivot-mechanism pin. A side of the shell facing a housing back wall includes a slot running the length of the shell through which the pivot-mechanism pin passes, with at least one end of the shell being open so that the spherical head has ingress and egress to the socket therethrough.

In one embodiment, the pivot-mechanism pin extends through a ring formed elastic wall portion mounted at an opening in the rear wall of the housing and is coupled to an adjusting bolt outside of the housing. The length axes of the adjusting bolt and the pivot-mechanism pin are approximately parallel and these two members are coupled by means of a moveable bridge which supports and determines the position of the pivot-mechanism pin, with the ring formed elastic wall portion having only the function of sealing the pivot-mechanism pin to the housing.

BRIEF DESCRIPTION THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF A PREFERRED EMBODIMENT

Figure 1:
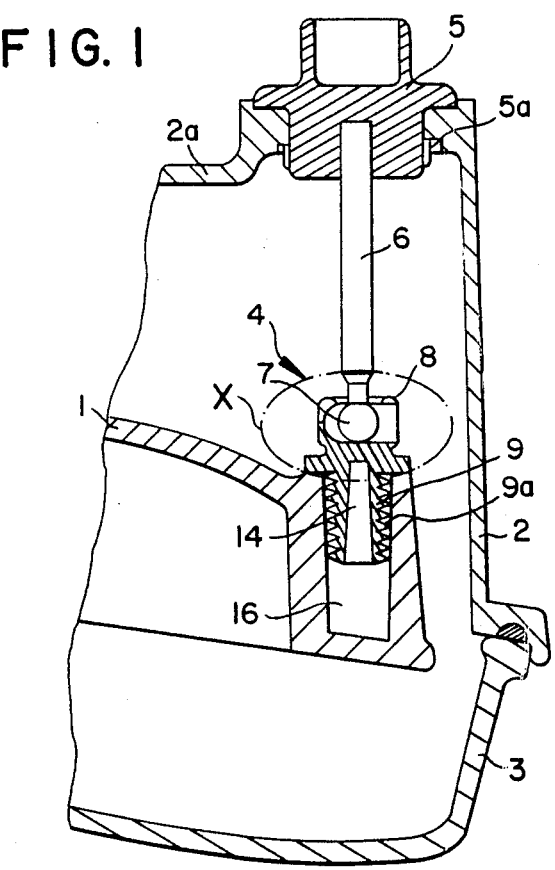
FIG. 1 is a segmented cross sectional view of a portion of a headlight depicting a fixed pivot-point mechanism according to principles of this invention.

Referring to FIG. 1, a reflector 1 is in a headlight housing formed by a main housing member 2 with a back wall 2a and a light transmissive shield 3 and is rotatable about two perpendicular, intersecting, reflector axes (usually horizontal and vertical). The axes are formed by two adjustable pivot-point mechanisms (not shown in FIG. 1) and a fixed pivot-point mechanism 4. The housing back wall 2a has an opening therein in which a plastic attachment member 5 is mounted, by means of a turninglock arrangement 5a. A free, or outer, end of the pivot-mechanism pin 6 is embedded in the plastic attachment member 5 while an opposite end, located in the interior of the housing, has a spherical head 7 which is arranged in a bore, or sockets, of a hollow shell 8. The shell 8 is, in turn, part of a receiver 9 that is rigidly attached to the reflector 1 by means of a receiver stub 9a. A length axis of the pivot-mechanism pin 6 extends parallel to an optical axis of the headlight while a length axis of the hollow shell 8, and its bore, extend perpendicular to the length axis of the pivot-mechanism pin 6. The width of a slot 10 facing the back wall 2a is greater than a cross sectional diameter of a portion of the pivot-mechanism pin 6 passing through the slot 10, as can be seen in FIG. 1, however, the slot 10 is sufficiently small so that the spherical head 7 cannot pass therethrough. Upon rotation of the reflector 1, the slot 10 is sufficiently wide that edges forming it do not come into contact with the pin 6. The length axis of the shell 8 extends approximately perpendicular to a horizontal reflector axis. The shell 8, at a free end 11, is open, so as to allow ingress and egress of the spherical head 7 while the other free end 12 of the shell has a slit opening 13 therein which extends into the slot 10. The free end 11 normally is directed radially outwardly. The slit opening 13 has a smaller width than the slot 10 in the shell 8. The shell 8 is at an upper end of the receiver 9, which includes the stub, or pin, 9a which is mounted in the reflector 1 and which has a bore 14 extending along the center thereof. A lower portion of the receiver stub 9a is tapered inwardly to its lower free end so as to be conical in shape and has on its perimeter surface surrounding ribs 15 that are tapered outwardly to their crests. The lower portion of the receiver stub 9a is self attaching to a cavity 16 in a backside of the reflector 1. To ensure that the receiver stub 9a is held in the cavity 16, the receiver 9 has a spring tongue 17 with a barb (not shown) at its free end which is insertable into a crevice (not shown) of the reflector 1. When the attachment member 5 is rotated to release its turn-lock threads from the back wall 2a, the pivot-mechanism pin 6 can be swiveled to manipulate the spherical head 7 along the axis of elongation of the shell 8 out of the shell's bore at the open free end 11. Therefore, a pivot pin mechanism of a power light-distance adjusting mechanism (of the type shown in FIG. 5) can be easily and quickly mounted in the socket, or bore, of shell 8 from the backside of the headlight without removing the reflector 1 from the housing. To do this, the spherical head of such a powered pivot-mechanism pin would be moved through the opening in the back wall. From outside the headlight housing it can be swung into the free open end 11 of the bore of the elongated shell 8 and attached in the opening in the back wall 2a by the turning lock arrangement 5a of the attachment member.

Figure 2:
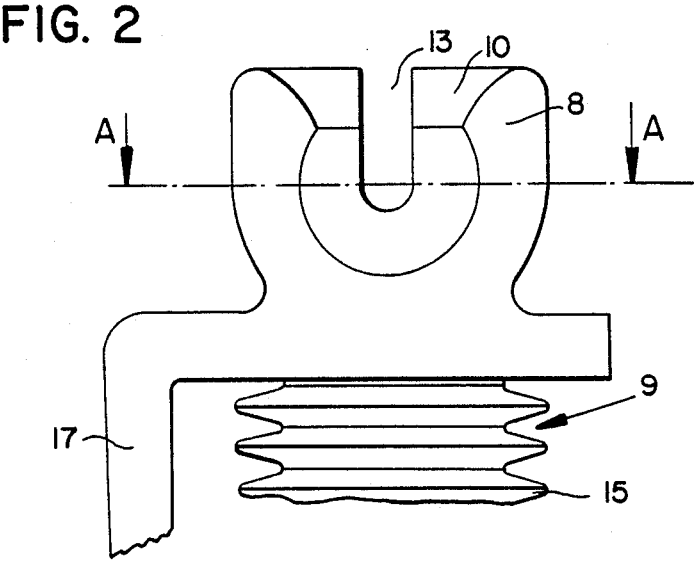
FIG. 2 is a detailed segmented view of the receiver portion of the pivot-point mechanism of this invention indicated at X in FIG. 1, but taken 90° to the right side of FIG. 1.
Figure 3:
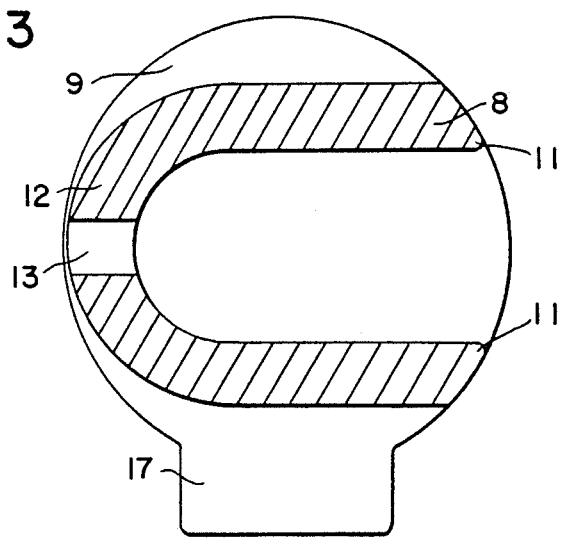
FIG. 3 is a sectional view taken on line A—A in FIG. 2.
Figure 4:
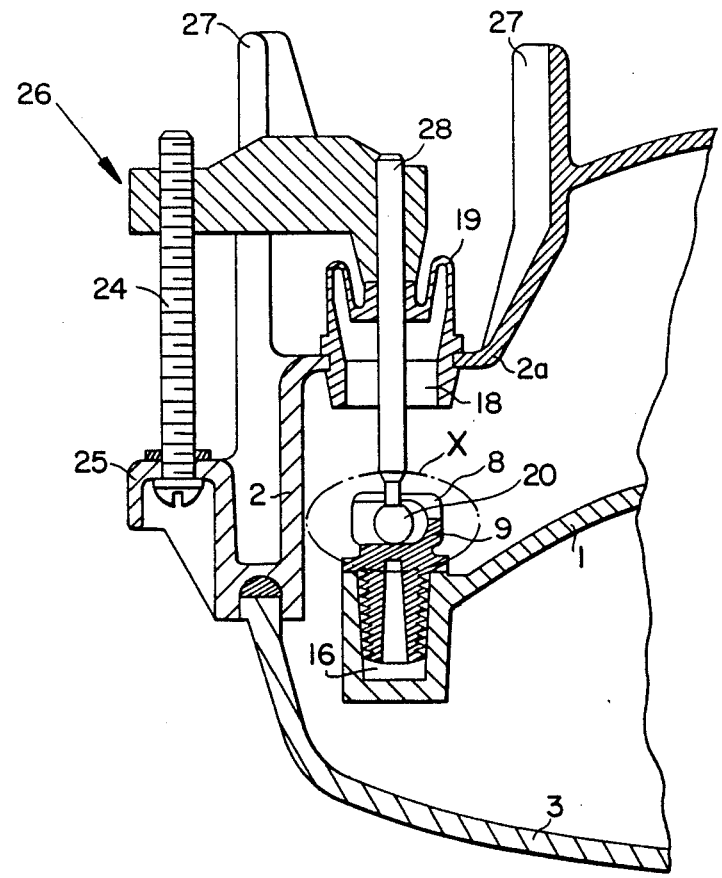
FIG. 4 is a segmented cross sectional view of a portion of a manually adjustable pivot-point mechanism according to principles of this invention.

Looking now at the embodiment of FIG. 4, a manually-adjustable embodiment of a pivot-point mechanism is disclosed. The pivot point mechanism of this embodiment is usually one of the adjustable pivot point mechanisms that is approximately at the horizontal reflector axis. The fixed pivot point mechanism of FIG. 1, is approximately at the vertical reflector axis. The adjustable pivot point mechanism of FIG. 4 includes an adjusting bolt 24 which is rotatably mounted in an opening of an edge member 25 of the main housing member 2 and extends therefrom in an opposite direction of a light beam produced by the headlight to mesh with female threads of a bridge 26. The bridge 26 is caused to move in a track, or guide, 27 by rotation of the adjusting bolt 24 in the edge member 25. A pivot mechanism pin 28 extends through a housing back wall 2a to be forced fitted in an opening of the bridge 26. The length axis of the pivot-mechanism pin 28 is parallel to the length axis of the adjusting bolt 24. The pivot-mechanism pin 28 extends through an opening 18 in the back wall 2a of the housing into the interior of the headlight. A ring formed elastic wall portion, comprising a roll membrane 19, clamps or compresses, onto the pivot mechanism pin 28 at its inner portion and its outer portion is sealed with an edge of the opening 18 of the back wall 2a of the main housing member 2. The free end of the pivot mechanism pin 28 in the interior of the headlight has a spherical head 20 attached thereto, which is positioned in the casing, shell, 8 that is part of the receiver 9 which is attached to the reflector 1. Details of the pivot-point mechanism, including cooperation between the spherical head 20 and the receiver 9 are identical with those shown in FIGS. 1, 2 and 3 and described in relation thereto.

Figure 5:
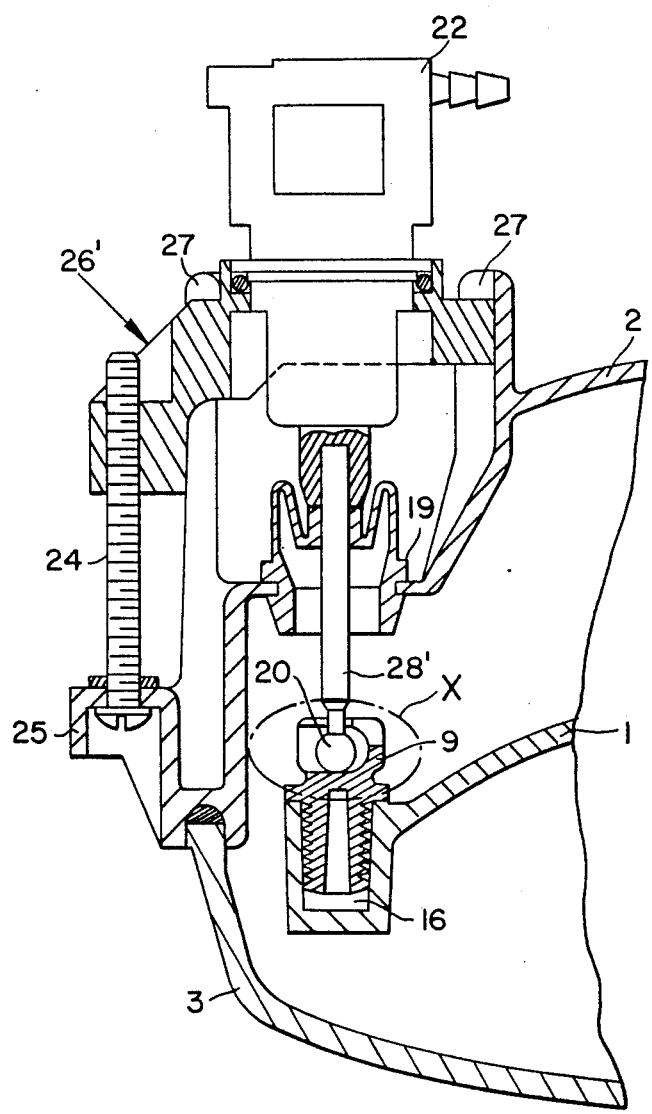
FIG. 5 is a partially cross sectional view of a power adjustable pivot-point mechanism according to principles of this invention.

FIG. 5 discloses an embodiment in which, in o addition to those elements depicted in FIG. 4 a power, or motor, light-distance adjusting mechanism 22 is included. The power light-distance adjusting mechanism is mounted in an opening in a modified bridge 26'. With this arrangement, it is easily possible to quickly mount the power light-distance adjusting mechanism 22 in a headlight from its back side. In this regard, it is possible to exchange the bridge 26 of FIG. 4 with the bridge 26' of FIG. 5. When dismounting, the bridge 26, first the adjusting bolt 24 is screwed off of the bridge 26. The bridge 26 is then removed from the guide 27. When this is done, it is easy to rotate the pivot mechanism pin 28 with its spherical head 7 out of the shell 8 and to remove it along with the roll membrane 19 out of the back wall opening 18. Mounting the bridge 26 or 26' is achieved by following these steps in the reverse order.

It will be understood by those of ordinary skill in the art that the pivot-point mechanisms of this invention allows smooth detachment of the sphere head from the shell socket. In this manner, a replacement does not cause damage to the mounting area of a headlight. It is helpful, when a new pivot-mechanism pin is mounted or dismounted, to pull the reflector to the back wall by extending fingers through a lamp changing opening in the back wall.

Also, it is advantageous for the length axis of the shell 8 in the fixed embodiment of FIG. 1 to be perpendicular to the horizontal reflector axis. In this manner, when the reflector is pivoted about the horizontal reflector axis the spherical head 7 can follow the bore or socket of the hollow shell 8 so that no tension is developed between the main housing member 2 and the reflector 1. It is also advantageous that the shell has a slit at its closed end that extends in the direction of the pivot-mechanism pin. With this structure, the pivot-mechanism pin can be urged toward the middle of the reflector when it is dismounted in the shell. This is particularly advantageous for automatic, or power, systems. It is also advantageous that the shell is at a free end of a pin shaped receiver stub whose length axis is perpendicular to the length axis of the shell and its bore and which is self clamped in a cavity of the reflector. In this manner, a pressure force against the reflector in an opposite direction from a light beam cannot cause a turning moment which destroys the receiver as in German Offenlegungsschrift 35 09 831.

In addition, it is advantageous to have a bore in the receiver stub and to have the surrounding ribs formed on an outer surface thereof which come in contact with walls of a cavity in the reflector. It is particularly helpful when the cavity in which the receiver is affixed under pressure is inwardly tapered in the direction in which the receiver pin is inset. In this manner, a safe, firm seating for the receiver in the reflector is brought about without the wedge effect of the pin shaped receiver producing a large outward force on the surface forming the cavity in the reflector.

It is also advantageous that the pivot mechanism pin is attached to the back wall of the main housing member by means of a turning lock, or meshing, arrangement. In this manner, the connection between the pivot-mechanism pin and the main housing member can be easily and quickly dismounted and mounted.

Yet another advantage of the FIGS. 4 and 5 embodiments of this invention is provided by using either a roll or pleated (accordian) membrane as the ring formed elastic wall portion. Such membranes are available off-the-shelf and allow easy adjustment of the pivot mechanism pin with very little force. Further, the pivot mechanism pin is thereby sealed against the housing.

The opening in the bridge is particularly helpful in that it allows a power light-distance adjusting mechanism to be mounted therein. A fixed pivot mechanism pin could also be mounted in this opening. Also, it is possible to replace the bridge with a bridge having a pivot mechanism pin affixed thereto as is shown in FIG. 4.

The embodiments of the invention in which an exclusive property or privilege are claimed are defined as follows:

1. In a vehicle headlight for casting a light beam along an optical axis of the type in which a reflector is mounted inside a headlight housing on first and second adjustable pivot-point mechanisms and a third pivot-point mechanism to be selectively rotated about two perpendicular intersecting reflector axes, at least one of the pivot-point mechanisms comprising a spherical head positioned in a receiver that is rigid with the reflector, the spherical head being mounted on the end of the elongated pivot-mechanism pin whose axis is approximately parallel to the optical axis of the headlight, and which extends to an opening in a back wall of the headlight housing, the improvements comprising:

the receiver comprising an elongated shell defining an elongated socket whose axis of elongation is perpendicular to the axis of the pivot mechanism pin, there being an elongated slot in a wall of the shell facing the back wall of the headlight housing through which the pivot-mechanism pin extends, at least one end of the socket being open to allow easy ingress and egress of the spherical head to and from the socket, the diameter of the socket corresponding to the diameter of the spherical head from said open end to a mounted position of the spherical head, the shell not including an inward rim at at least the open end of the socket.

2. In a vehicle headlight as in claim 1, wherein the shell includes on one side thereof an elongated receiver stub whose axis of elongation is perpendicular to the axis of elongation of the shell and which is attached to the reflector in a cavity thereof.

3. In a vehicle headlight as in claim 2, wherein the elongated receiver stub has a bore therethrough to provide resiliency thereto.

4. In a vehicle headlight as in claim 3, wherein ribs are formed on the outer surface of the elongated receiver stub which engage the reflector cavity.

5. In a vehicle headlight as in claim 4, wherein the reflector cavity is inwardly tapered in the direction in which the receiver stub extends.

6. In a vehicle headlight as in claim 2, wherein ribs are formed on the outer surface of the elongated receiver stub which engage the reflector cavity.

7. In a vehicle headlight as in claim 2, wherein the reflector cavity is inwardly tapered in the direction in which the receiver stub extends.

8. In a vehicle headlight as in claim 2, wherein a rotatable locking means is included for coupling the pivot pin to the back wall of the housing.

9. In a vehicle headlight as in claim 1, wherein the other end of the elongated shell is substantially closed but includes a slit opening which extends in the direction in which the pin extends.

10. In a vehicle headlight as in claim 9, wherein the shell includes on one side thereof an elongated receiver stub whose axis of elongation is perpendicular to the axis of elongation of the shell and which is attached to the reflector in a cavity thereof.

11. In a vehicle headlight as in claim 9, wherein a rotatable locking means is included for coupling the pivot pin to a back wall of the housing.

12. In a vehicle headlight as in claim 1, wherein one reflector axis is horizontal and the axis of elongation of the shell of said at least one pivot point mechanism is approximately perpendicular thereto.

13. In a vehicle headlight as in claim 12, wherein the shell includes on one side thereof an elongated receiver stub whose axis of elongation is perpendicular to the axis of elongation of the shell and is attached to the reflector in a cavity thereof.

14. In a vehicle headlight as in claim 13, wherein the other end of the elongated shell is substantially closed but includes a slit opening which extends in the direction in which the pin extends.

15. In a vehicle headlight as in claim 12, wherein a rotatable locking means is included for coupling the pivot pin to a back wall of the housing.

16. In a vehicle headlight as in claim 1, wherein a rotatable locking means is included for coupling the pivot pin to a back wall of the housing.

17. In a vehicle headlight for casting a light beam along an optical axis of the type in which a reflector is mounted in a headlight interior defined by a headlight housing including a light transmissive shield and a main housing member on first and second adjustable pivot-point mechanisms and a third pivot point mechanism to be rotatable about two perpendicular intersecting reflector axes, at least one of the first and second adjustable pivot-point mechanisms including a pivot-mechanism pin which releasably engages a receiver that is rigidly affixed to the reflector, the bolt being embedded in a ring-formed elastic portion of the headlight housing, an end portion of the pivot-mechanism pin extending outside the headlight housing and being coupled with an adjusting bolt and which rotatably engages the headlight housing, the improvement in which:

a length axis of the pivot-mechanism pin is approximately parallel to the adjusting bolt and the pivot-mechanism pin is coupled to the adjusting bolt via a moveable bridge, the bridge supporting and determining the position of the pivot mechanism pin with the ring-formed elastic portion serving to provide sealing between the pivot-mechanism pin and the headlight housing.

18. In a vehicle headlight as in claim 17, wherein the ring-formed elastic portion is a pleated or rolling membrane.

19. In a vehicle headlight as in claim 18, wherein the bridge has a bridge opening in which a power light-distance adjusting mechanism is mountable.

20. In a vehicle headlight as in claim 17, wherein the receiver includes an elongated receiver stub having a bore therethrough to provide resiliency thereto, said elongated receiver stub being mounted in a cavity of said reflector.

21. In a vehicle headlight for casting a light beam along an optical axis of the type in which a reflector is mounted inside a headlight housing on first and second adjustable pivot-point mechanisms and a third pivot-point mechanism to be selectively rotated about two perpendicular intersecting reflector axes, at least one of the pivot-point mechanisms comprising a spherical head positioned in a receiver that is rigid with the reflector, the spherical head being mounted on the end of an elongated pivot-mechanism pin whose axis is approximately parallel to the optical axis of the headlight, and which extends to an opening in a back wall of the headlight housing, the improvements comprising:

the receiver comprising an elongated shell defining an elongated socket whose axis of elongation is perpendicular to the axis of the pivot mechanism pin, the diameter of the socket corresponding to the diameter of the spherical head, there being an elongated slot in a wall of the shell facing the back wall of the headlight housing through which the pivot-mechanism pin extends, at least one end of the socket being open to allow ingress and egress of the spherical head to and from the socket, wherein the shell includes on one side thereof an elongated receiver stub whose axis of elongation is perpendicular to the axis of elongation of the shell and which is attached to the reflector in a cavity thereof.

* * * * *